United States Patent [19]

Hamada

[11] Patent Number: 5,207,319

[45] Date of Patent: May 4, 1993

[54] CONTAINER FOR FLOPPY DISK, COMPACT DISK OR OTHER MEMBERS OF SIMILAR CONFIGURATION

[76] Inventor: Katsutoshi Hamada, 15-26-1025, Uriwarinishi 1-chome, Hirano-ku, Osaka-shi, Japan

[21] Appl. No.: 805,068

[22] Filed: Dec. 11, 1991

[30] Foreign Application Priority Data

Jan. 11, 1991 [JP] Japan ................................. 3-485[U]

[51] Int. Cl.⁵ ..................... B65D 77/00; B65D 43/04; B65D 43/08
[52] U.S. Cl. ................................. 206/216; 220/352; 220/503; 220/521
[58] Field of Search ............. 312/308, 309, 237, 8–15, 312/293.1, 293.2; 206/216, 223, 102, 86; 220/521, 522, 352, 353, 503

[56] References Cited

U.S. PATENT DOCUMENTS

| 918,742 | 4/1909 | Ferdon | 312/309 |
| 4,270,817 | 6/1981 | McRae | 312/15 |
| 4,367,000 | 1/1983 | Sparks et al. | 312/10 |
| 4,448,463 | 5/1984 | Amos | 312/293.1 |
| 4,826,261 | 5/1989 | Nademlejnsky . | |
| 4,844,247 | 7/1989 | Moy . | |
| 5,011,034 | 4/1991 | Abel | 220/521 |

FOREIGN PATENT DOCUMENTS

| 0248592 | 12/1987 | European Pat. Off. . | |
| 3123337 | 12/1982 | Fed. Rep. of Germany . | |
| 2428888 | 1/1980 | France . | |
| 282597 | 12/1927 | United Kingdom | 220/352 |

Primary Examiner—William I. Price
Attorney, Agent, or Firm—Thomas J. Dodd

[57] ABSTRACT

A disk container includes a main body having an insertion opening formed in a front portion thereof for inserting an article into the main body, and a top member attached to a top portion of the main body, the top member being adapted for performing a specified auxiliary function, such as disk stand, tray, pen stand.

10 Claims, 15 Drawing Sheets

CONTAINER FOR FLOPPY DISK, COMPACT DISK OR OTHER MEMBERS OF SIMILAR CONFIGURATION

BACKGROUND OF THE INVENTION AND PRIOR ART STATEMENT

This invention relates to a container for accommodating therein floppy disks, compact disks, or those having configuration similar to these disks, such as video cassettes and tape cassettes.

A disk container for accommodating therein disks has generally an insertion opening defined in a front wall thereof. A multitude of disks are inserted in an interior of the container through the insertion opening.

There has recently proposed formation of an auxiliary usable portion, such as a disk stand and a tray, on a top portion of the disk container as described above so as to enhance the function of the disk container itself. However, to make a wide variety of auxiliary usable portions available, the same number of types of disk containers are forced to be produced as that of the wide variety of types of auxiliary usable portions. This involves the inconvenience that the productivity of disk containers falls while the cost thereof increasing. This also exerts economic burden on users since they have to purchase a wide variety of types in disk containers having necessary auixiliary usable portions individually.

In consideration of the above drawbacks, it is an object of the present invention to provide a container designed to enhance function thereof and further provide a wide variety of functions without reducing the productivity and economy thereof.

SUMMARY OF THE INVENTION

A container of the present invention comprises a main body having an insertion opening formed in a front portion thereof for inserting an article into the main body, a top member attached to a top portion of the main body, the top member being adapted for performing a specified auxiliary function.

Also, the top member may be fixedly attached to the top portion of the main body.

Further, the top member may be removably attached to the top portion of the main body.

Furthermore, the container includes a plurality of additional top members removably attachable to the top portion. The plurality of additional top members are adapted for performing respective different specified auxiliary functions.

With the above-mentioned constructions, the container is provided with the top member for performing a specified auxiliary function. Also, the provision of the plurality of additional top members gives the user selection of a suitable top member from a wide variety of top members having different specified auxiliary functions. Accordingly, the user can enjoy various auxiliary functions at a reduced cost. The productivity of containers can be increased to a remarkable extent.

These and other objects, features and advantages of the present invention will become more apparent upon a reading of the following detailed description and accompanying drawings.

DETAILED DESCRIPTION OF THE PREFERRED EMBODIMENTS OF THE INVENTION

FIGS. 1 to 5 show a disk container embodying the invention. In this embodiment, there is shown a disk container for accommodating a cased floppy disk D (hereinafter referred to merely as floppy disk D) as an example. However, the invention is not limited to this embodiment, but applicable to a variety of containers for accommodating compact disks, or those having configuration similar to the floppy disk. It should be noted that in the drawings, like references denote like parts, particularly, large arrows F indicate a forward direction of the disk container or a top member in various views.

The disk container includes a main body 10 in the form of a rectangular parallelepiped, to which a top member 12 and a rear wall 14 to be described later are removably mounted.

The container main body 10 is hollow, and has an insertion opening 16 defined in one of the walls thereof (hereinafter, the wall having the opening 16 defined therein is referred to as a front wall). The floppy disk D can be inserted into an interior of the container main body 10 through the insertion opening 16.

In the interior of the container main body 10, disk support members 20 of relatively large width and disk guide members 22 of relatively small width are alternately provided at opposite side walls 18, 18 with projecting horizontally to a center of the container main body 10. The support members 20 and the guide members 22 extends in a direction parallel to the top member 12 in position, i.e., in a crosswise direction from the front to the back of the container main body 10. A disk stopper 24 projects upward from a front end of each disk support member 20.

Further, a plate spring 25 is secured to an inner surface of the rear wall 14. The plate spring 25 includes a base portion 25a extending in a vertical direction and a plurality of spring portions 25b extending to opposite sides of the rear wall 14 with bent to the forward (to the downward in FIG. 4). Bent portions 25c are formed at opposite side ends of respective spring portion 25b. The base portion 25a is secured to the rear wall 14 with the respective spring portions 25b being positioned substantially above the corresponding disk support members 20.

With the disk container thus constructed, the floppy disk D is inserted over the respective disk stoppers 24 and pushed further inside, whereby pushing the corresponding spring portions 25b. The spring portions 25b in turn move toward the surface of the rear wall 14, i.e., in directions indicated by arrows in FIG. 4. Thereafter, when the floppy disk D is dropped on the disk support members 20 as indicated by phantom lines in FIG. 4, the floppy disk D is pressed against the disk stoppers 24 by the springback of the plate spring 25, whereby stopped in a storage position. Conversely, by pushing the floppy disk D in the storage position to the back while lifting it slightly, the floppy disk D can be easily taken out of the disk container with the use of the springback of the plate spring 25.

It will be understood that the invention does not particularly specify the configuration of the container main body 10. For example, the container main body 10 may not be provided with the plate spring 25.

Next, there will be described attaching structures of the top member 12 and the rear wall 14.

Figure 1:
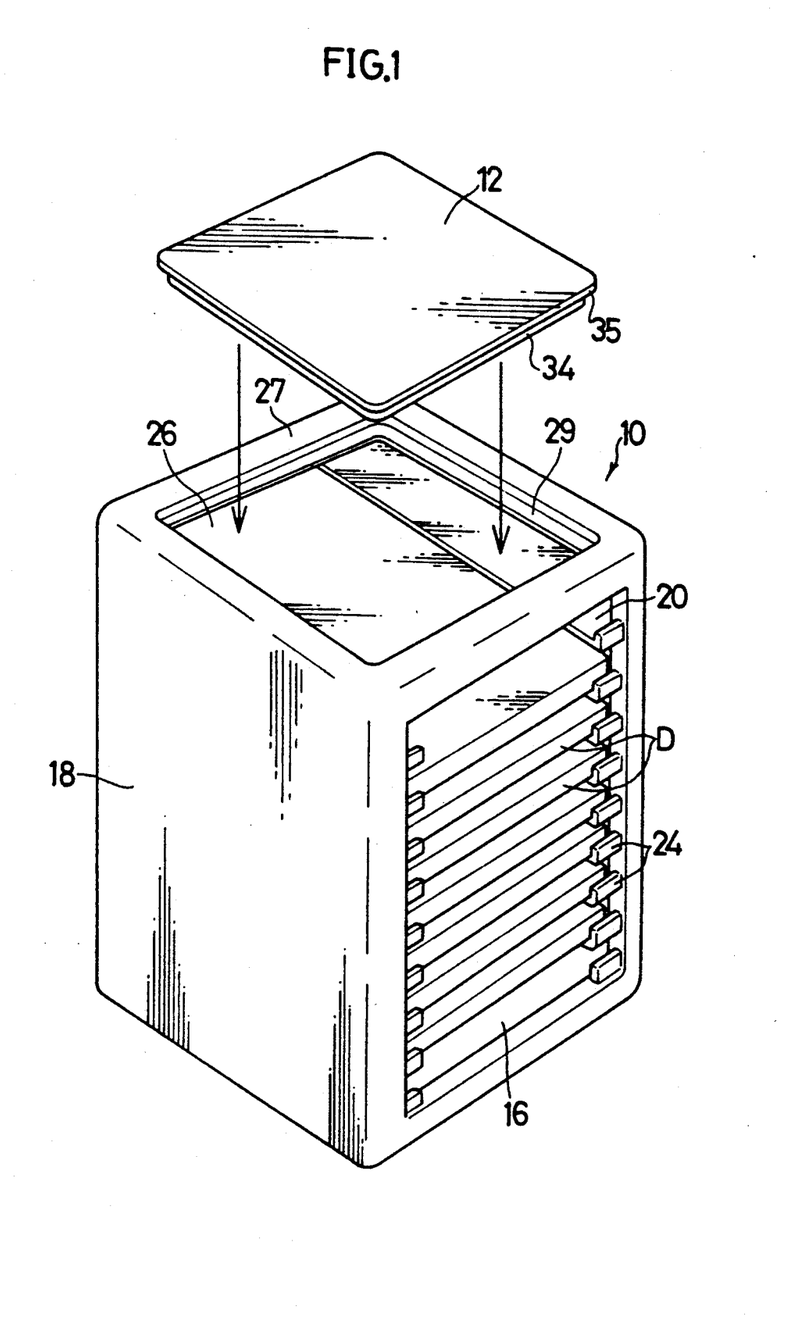
FIG. 1 is a perspective view showing a first disk container embodying the invention.
Figure 2:
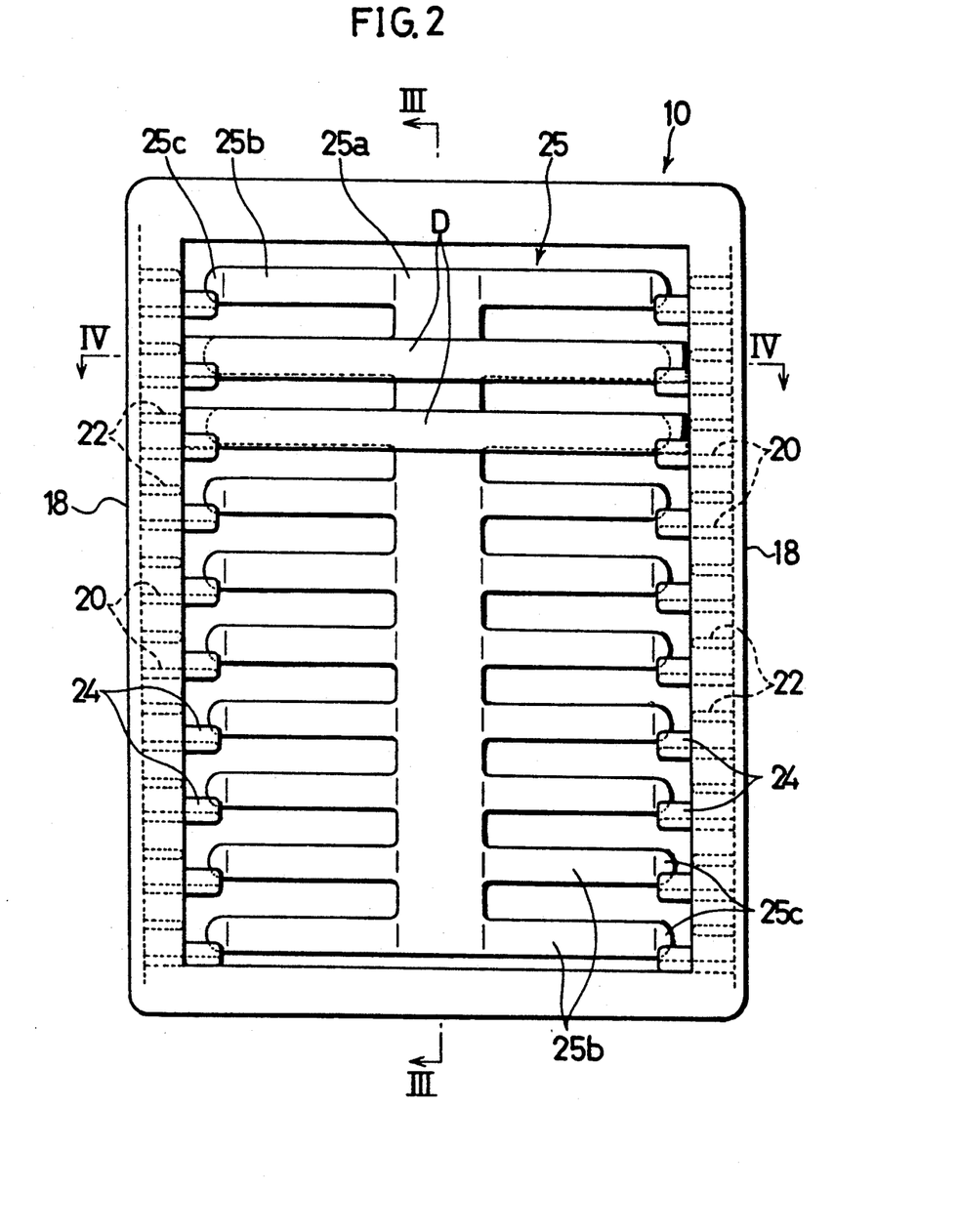
FIG. 2 is a front view of the first disk container.
Figure 3:
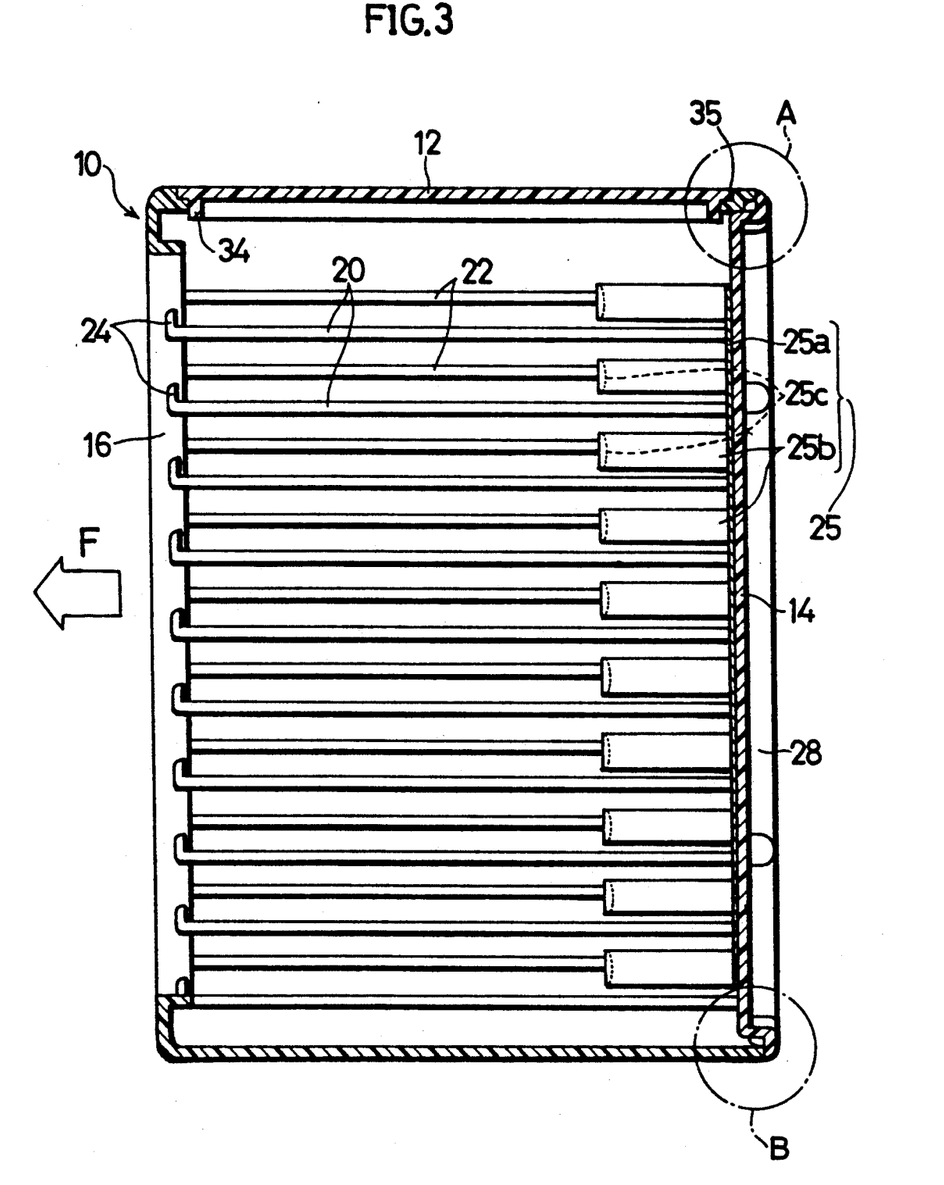
FIG. 3 is a sectional view taken along the line III—III in FIG. 2.
Figure 4:
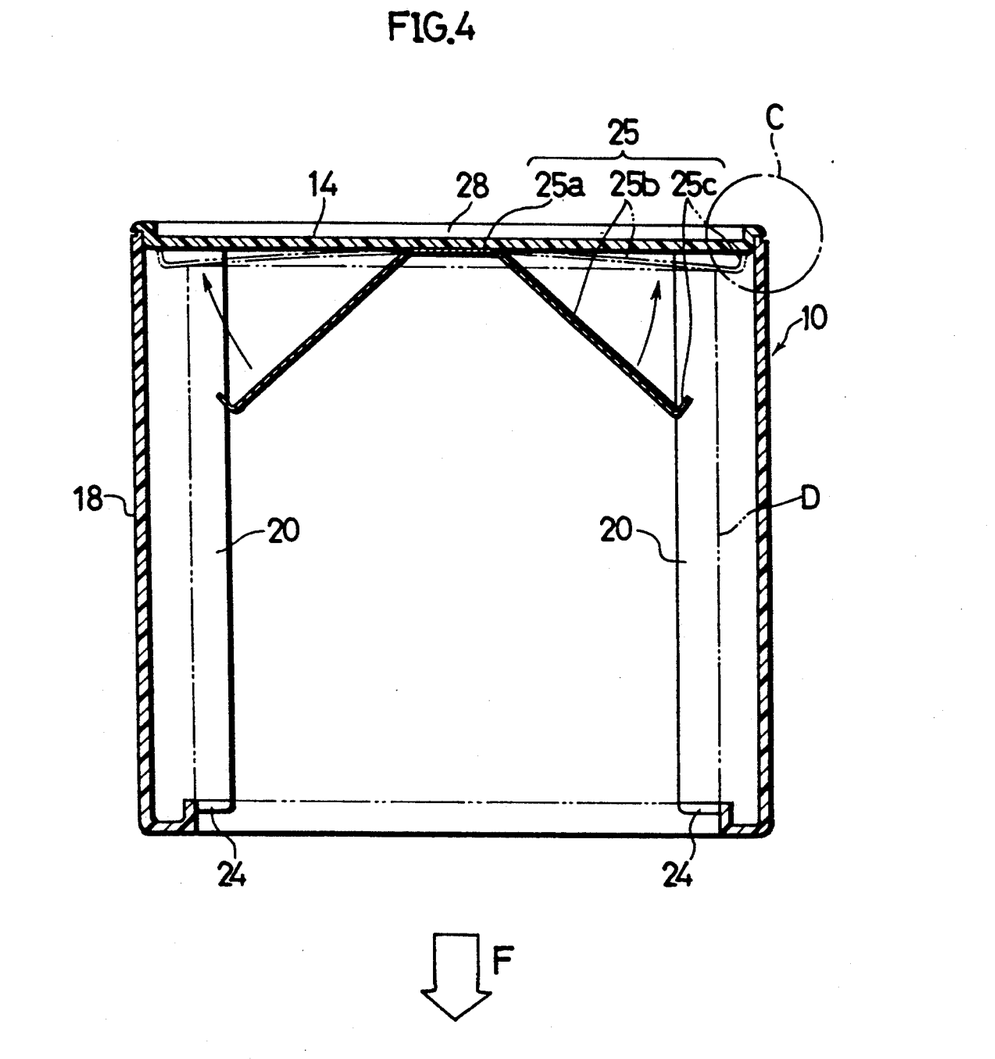
FIG. 4 is a sectional view taken along the line IV—IV in FIG. 2.
Figure 5A:
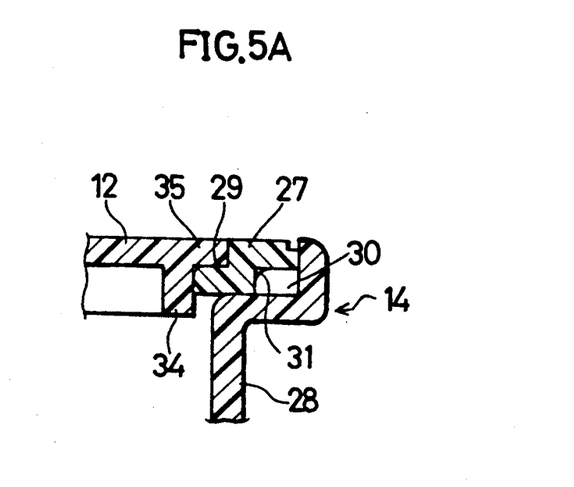
FIG. 5A is an enlarged view of a section A in FIG. 3.

First, the description is made on the attaching structure of the top member 12. In a top wall 27 of the container main body 10 is defined an opening 26 substantially in the form of a rectangle as shown in FIG. 1. In the periphery of the opening 26 is formed a stepped portion (top member mounting portion) 29 as shown in FIG. 5A. On the other hand, the top member 12 includes a base portion in the form of a simple rectangular plate and a projected portion 34 provided projectingly downward from an underside of the base portion of the top member 12. The projected portion 34 is formed inward of the outer edges of the base portion to provide a peripheral portion 35. The width of the peripheral portion 35 is equal to the width of the stepped portion 29. The peripheral portion 35 is fitted to the stepped portion 29. Accordingly, the top member 12 can be removably attached to the container main body 10 (a state shown in FIGS. 3 and 5A).

Figure 5B:
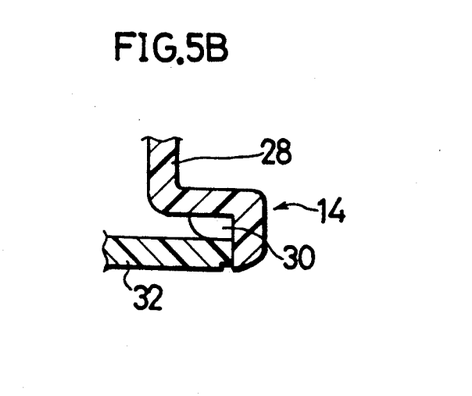
FIG. 5B is an enlarged view of a section B in FIG. 3.

Next, the attaching structure of the rear wall 14 will be described. The rear wall 14 includes a base portion 28 and a projected peripheral portion as shown in FIGS. 3, and 5A to 5C. Guide claws 30 as shown in FIGS. 5A and 5B are provided on an upper surface and a lower surface of the projected peripheral portion 28. These guide claws 30 have smoothly curved surfaces facing the container main body 10, so that the rear wall 14 can be easily fitted into the container main body 10. Further, at a rear end of the top wall 27 of the main body 11 (a right end portion in FIG. 5A) is formed a stepped portion 31 to which the upper guide claw 30 is fittable.

Figure 5C:
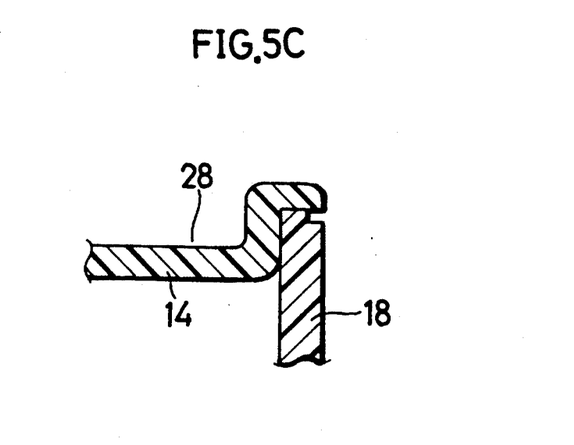
FIG. 5C is an enlarged view of a section C in FIG. 4.

The upper surface of the projected peripheral portion is fitted on the underside of the top wall 27 as shown in FIG. 5A. The lower guide claw 30 formed on the lower surface of the projected peripheral portion is fitted on the top surface of a bottom wall 32 of the container main body 10 as shown in FIG. 5B. Opposite sides of the projected peripheral portion are fitted inside the opposite side walls 18, 18 of the container main body 10 as shown in FIG. 5C. In this way, the rear wall 14 can be removably attached to the container main body 10.

In the present invention, it is sufficient that the top member 12 be formed independently from the disk container 10. Accordingly, the rear wall 14 may be formed integrally with the container main body 10. Further, the invention does not particularly specify the attaching structure of the top member to the container main body 10. For example, guide claws similar to the guide claws provided for the rear wall attachment may be provided on the underside of the top member 12.

In accordance with the disk container as described above, the top member 12 is formed independently from the container main body 10. Accordingly, even in the case where only the container main body 10 of one type is manufactured, a disk container is allowed to have a variety of additional functions by selecting one out of various shaped top members according to needs and attaching the selected top member to the stepped portion 29 provided on the container main body 10.

Figure 6:
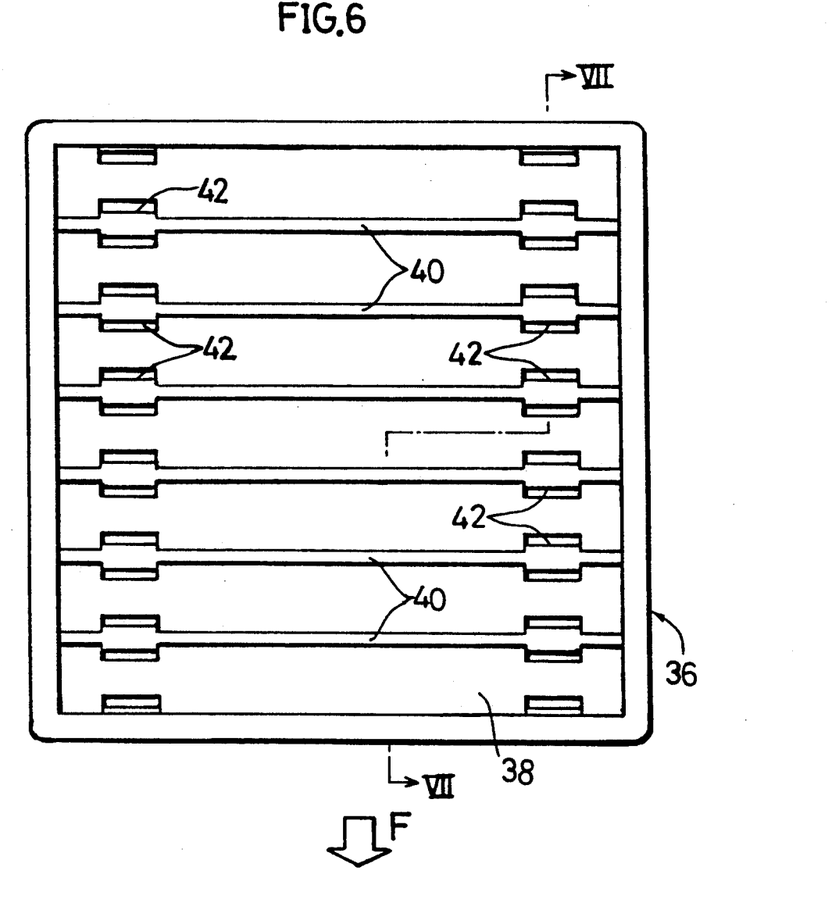
FIG. 6 is a plan view showing a first top member to be mounted to a main body of the first disk container.
Figure 7:
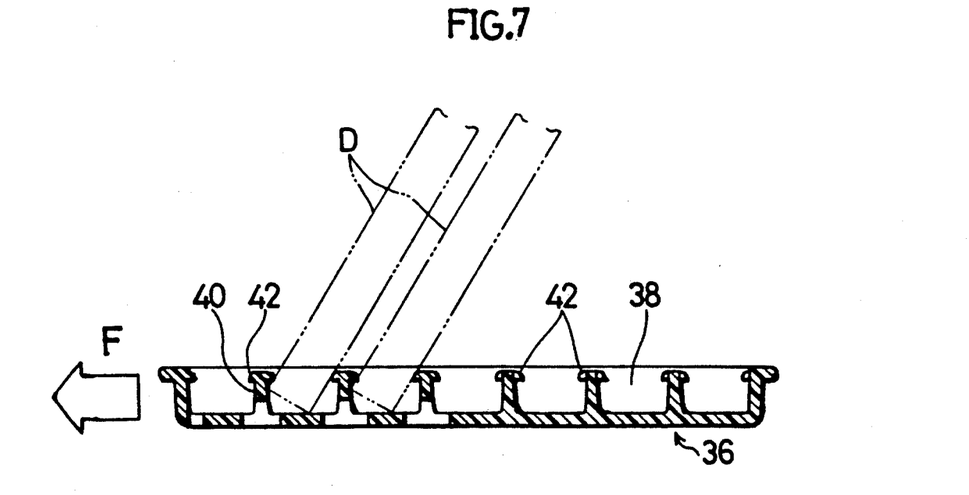
FIG. 7 is a sectional view taken along the line VII—VII in FIG. 6.
Figure 8:
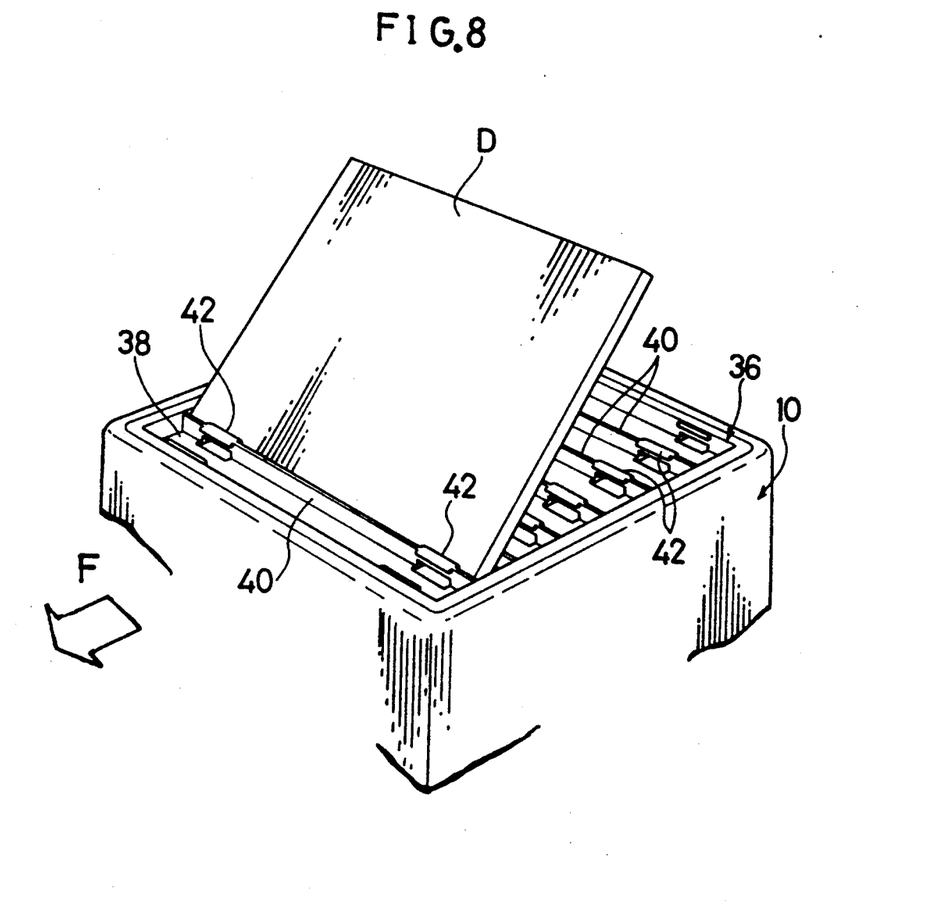
FIG. 8 is a perspective view showing the first top member in its used state.

FIGS. 6 to 8 show a top member 36 serving also as a disk stand as an example of a top member having a special function. A large arrow in each of FIGS. 6 to 8 indicates a frontward direction of the top member 36.

At a center of the top member 36 is formed a recessed portion 38 concave downward. A plurality of bars 40 extending in a transverse direction of the top member 36, i.e., from one side to the other of the top member 36, are provided on the upper surface of the recessed portion 38. At opposite ends of each bar 40 are formed disk stoppers 42 projecting to the front and to the back of the top member 36. A lower end portion of each floppy disks D is inserted between two adjacent bars 40. The insert floppy disks D are inclined backward, whereby the lower end portions thereof come into contact with the stoppers 42, with the result that the floppy disks D are stood with inclined backward.

By attaching the top member 36 as described above to the container main body 10 instead of the top member 12, there is obtained a disk container capable of temporarily storing floppy disks D on the top wall thereof.

A disk container having a top member removably attachable to a main body 10 thereof is shown in the foregoing embodiments. However, the top member may be completely secured to the container main body 10. Even in this case, a production process for fabricating the container main body 10 is in common with disk containers of any type. Accordingly, production costs can be effectively reduced.

Figure 9:
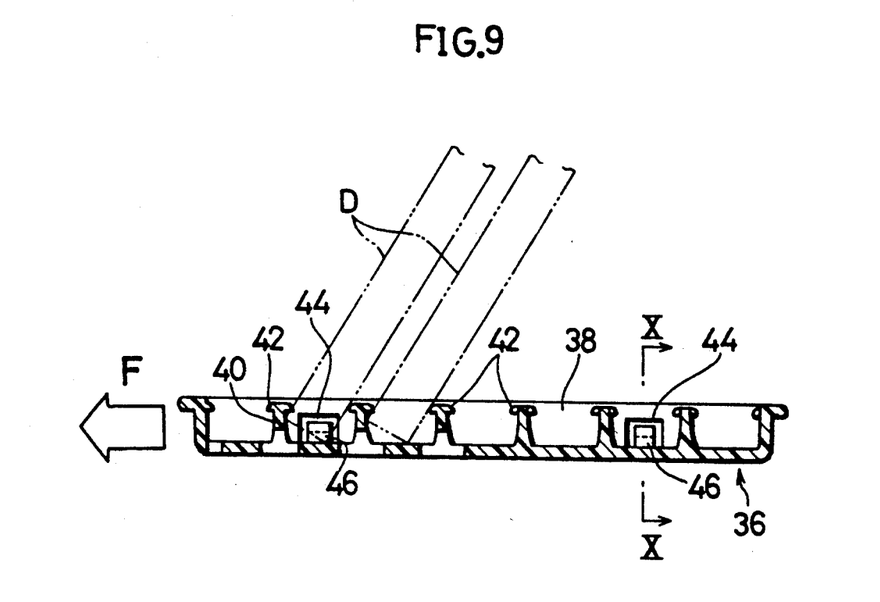
FIG. 9 is a front view in section showing a second top member.
Figure 10A:
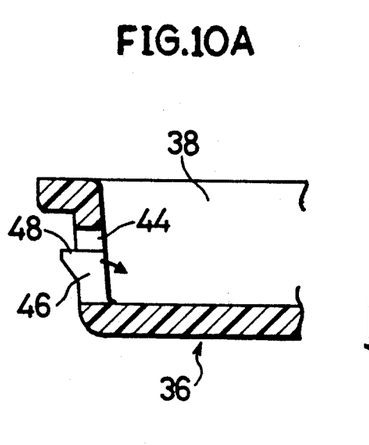
FIG. 10A is a sectional view taken along the line X—X in FIG. 9.
Figure 10B:
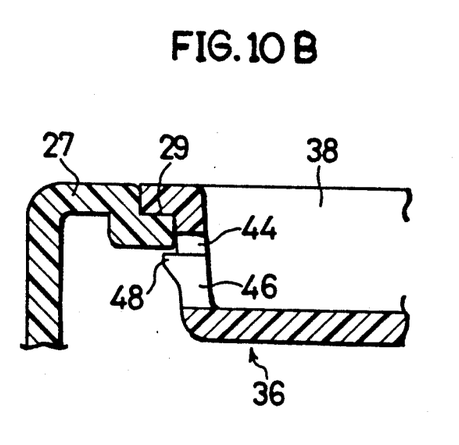
FIG. 10B is a front view in section showing the second top member in its mounted state.

FIGS. 9 and 10 show an exemplary construction of a disk container in which a top member 36 is completely secured to a container main body. A large arrow in FIG. 9 indicates a frontward direction of the top member 36. As will be seen in FIGS. 9 and 10, windows 44 in the form of a rectangle are formed in a plurality of positions at opposite side walls of the top member 36, and clip members 46 are provided in the windows 44 with each projecting upward. The clip member 46 is flexible in an inward direction of the top member 36, i.e., an arrow direction in FIG. 10A. At an upper end of the clip member 46 is formed a clip portion 48 in the form of a taper, which gradually expands outside the top member 36 as it extends from a lower end to an upper end thereof.

When the top member 36 thus constructed is pushed into the opening 26 defined in the top wall 27 of the container main body 10 (see FIG. 1) from above, the click members 46 are pressed by the peripheral portion of the opening 26, flexing in the inward direction of the top member 36. In this way, the top member 36 can be completely fitted into the container main body 10 as shown in FIG. 10B. In this state, the clip portion 48 is caught by the inner circumferential portion of the stepped portion 29, making it impossible for the top member 36 to be removed from the container main body 10. More specifically, the top member 36 is unremovably fitted to the stepped portion 29 of the container main body 10.

As described above, according to the invention, a top member may be unremovably secured to a main body of a disk container. However, a top member removably attachable to the container main body is more advantageous in that a user is allowed to enjoy various functions just by purchasing a single container main body, and then selecting one top member out of various many top members according to needs and attaching the selected top member to the container main body.

The form of a top member to be used in the present invention is not limited to the top member 12 of the foregoing embodiment, and exceedingly many top members can be considered. Several of these top members are shown in FIGS. 11 to 15 as a part of examples.

Figure 11A:
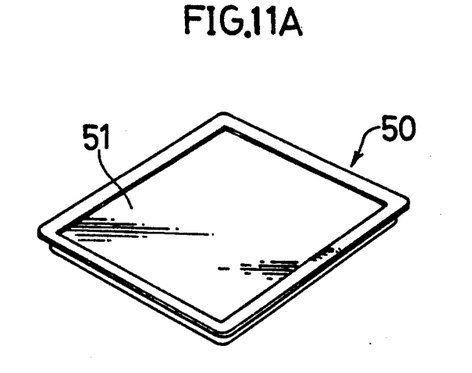
FIGS. 11A to 11C are perspective views showing third, fourth, and fifth top members respectively.

FIG. 11A shows a tray type top member 50 having a rectangular recessed portion 51 at a center thereof.

Figure 11B:
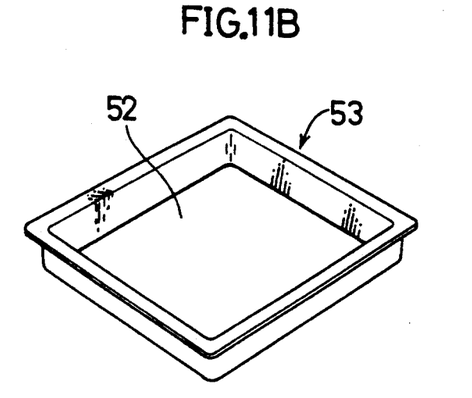

FIG. 11B shows a top member 53 having a rectangular opening 52 at a center thereof.

Figure 11C:
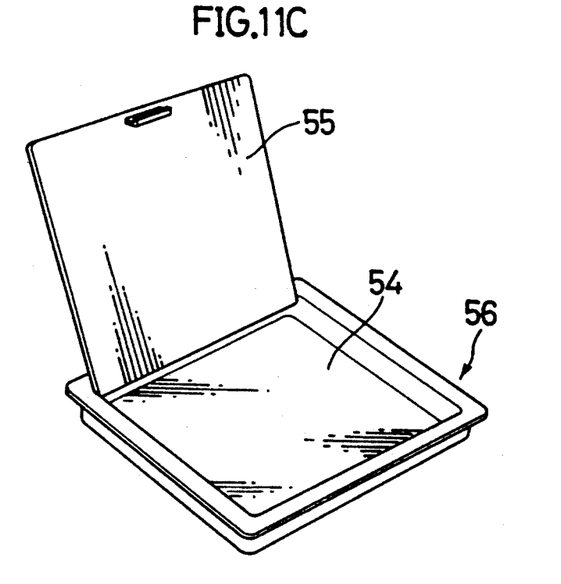

FIG. 11C shows a top member 56 having a rectangular recessed portion 54 at a center thereof and an auxiliary top member 55 for opening or closing the recessed portion 54, thereby serving also as a box for storing small articles.

Figure 12A:
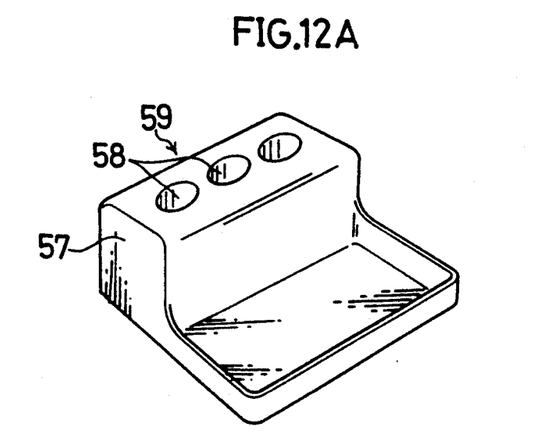
FIGS. 12A to 12C are perspective views showing sixth, seventh, and eighth top members respectively.

FIG. 12A shows a top member 59 including a pen stand 57 having pen insertion holes 58 defined therein.

Figure 12B:
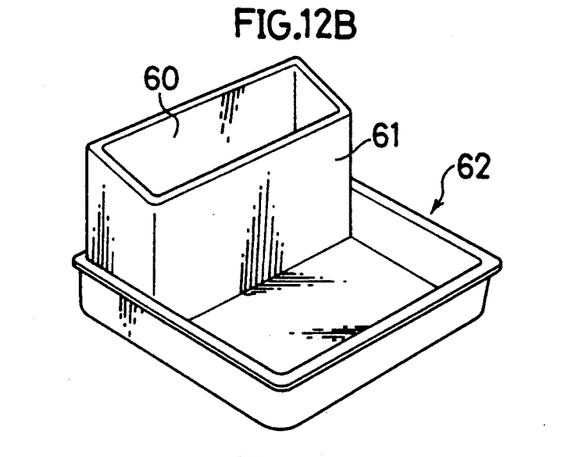

FIG. 12B shows a top member 62 including a memorandum pad stand 61 having an opening 60 facing upward.

Figure 12C:
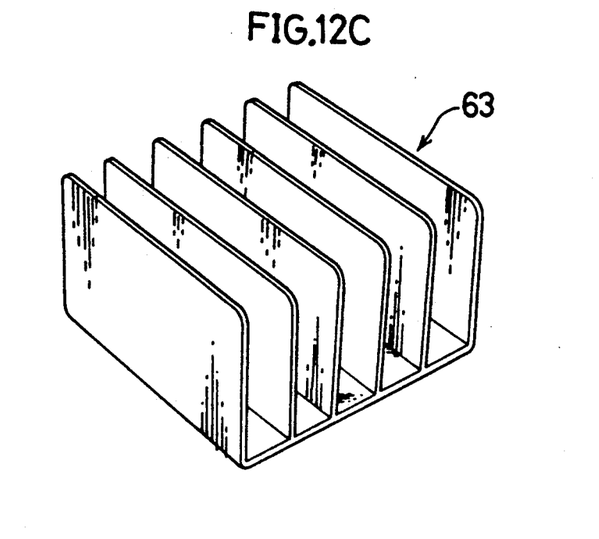

FIG. 12C shows a top member 63 serving also as a disk stand 63 having a plurality of partitioning walls.

Figure 13:
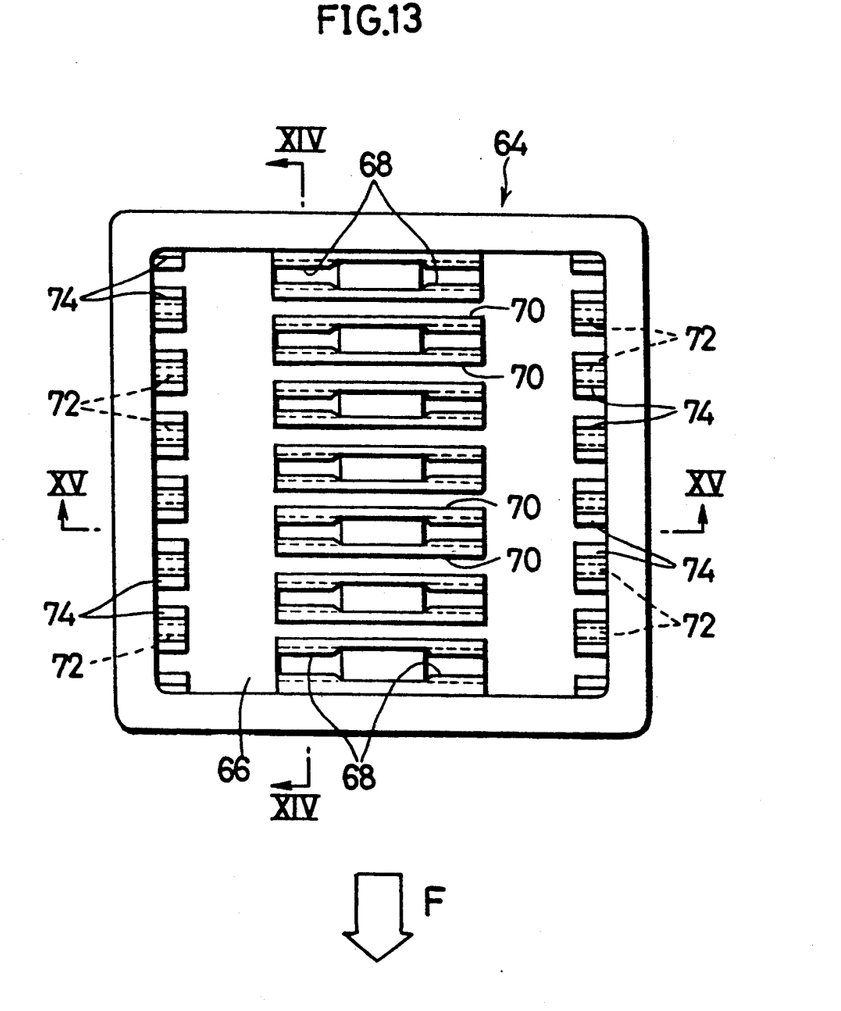
FIG. 13 is a plan view showing a ninth top member.
Figure 14:
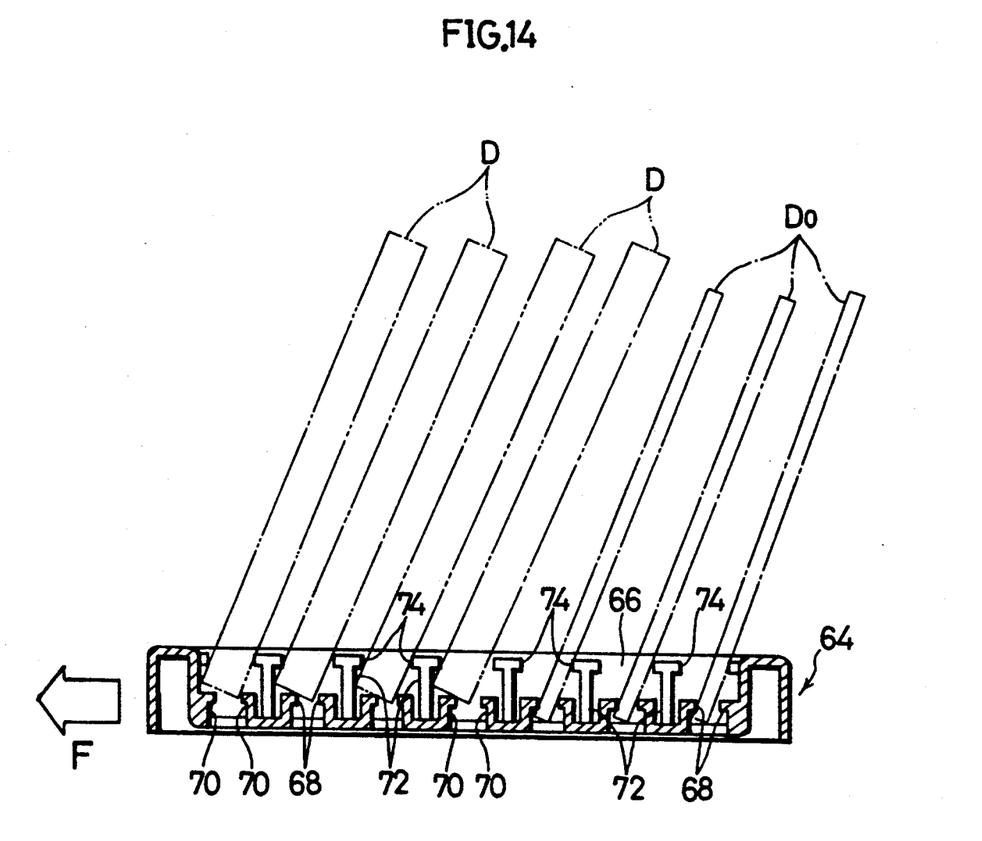
FIG. 14 is a sectional view taken along the line X IV—X IV in FIG. 13.
Figure 15:
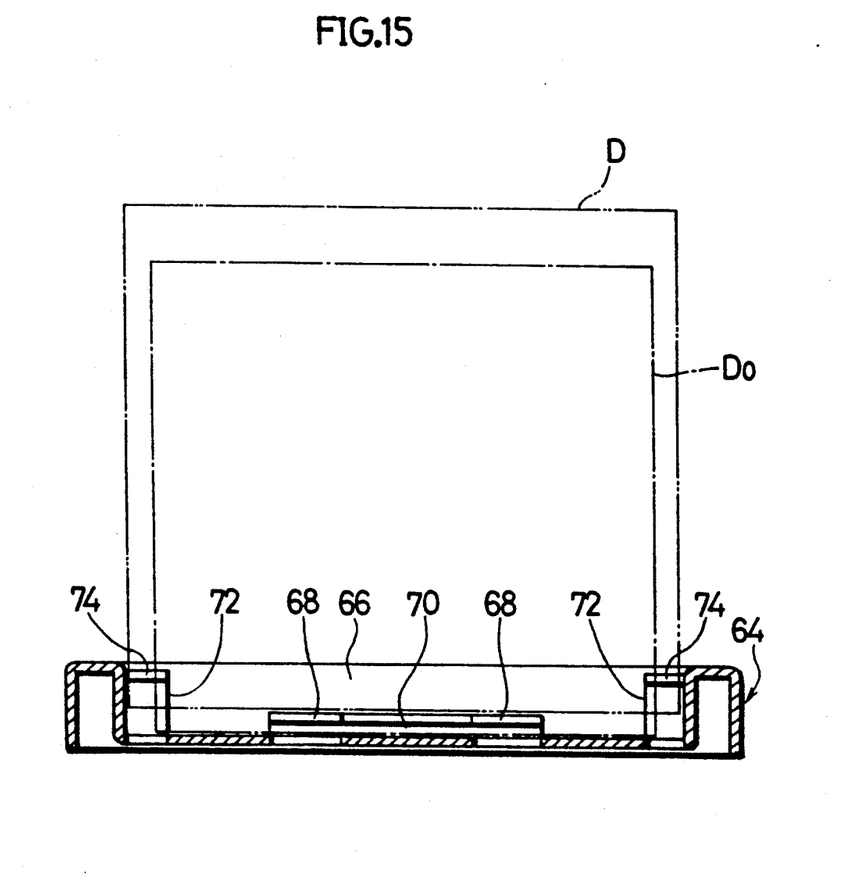
FIG. 15 is a sectional view taken along the line X V—X V in FIG. 13.

FIGS. 13 to 15 show a top member 64 serving also as a disk stand having a special function of standing both encased disks D and uncased disks Do.

At a center of the top member 64 shown in FIGS. 13 to 15 is formed a recessed portion 66 similarly to the top member 36. A plurality of pairs of support walls 70 extending in a transverse direction of the top member 64 are arranged at an equal spacing on a center portion of the top member 64 with projecting upward. A disk stopper 68 is formed at an upper end of one support wall 70 of one pair and projects toward the other support wall 70 of the same pair.

In opposite side end portions of the recessed portion 66 are formed support members 72 in positions corresponding to the space between the two support walls 70 of respective pairs. A disk stopper 74 is formed at an upper end of the support member 72 with projections in a forward and backward directions of the top member 64.

With the top member thus constructed, in the case of standing the encased disk D having a relatively large width in the disk stand provided in the top member 64, rear side angled portions (a right angled portion in FIG. 14) of a lower end of the disk D are supported by the disk stoppers 68 of the pair of support walls 70, and front side angled portions (a left angled portion in FIG. 14) are supported by a middle portion of the support member 72. The disk D is also supported by the forwardly projecting disk stopper 74 of the support member 72 at a rear side portion thereof slightly above the rear side angled portions thereof. The disk D is further supported by the forwardly projecting disk stopper 74 of the support member 72 at a front side portion thereof slightly above the front side angled portions thereof. In this way, the encased disk D can be reliably supported with inclination. On the contrary, in the case of standing the uncased disk Do having a relatively small width in the disk stand, a lower end of the disk Do is supported by the pair of support walls 72, whereby the disk Do can be supported with inclination.

Figure 16A:
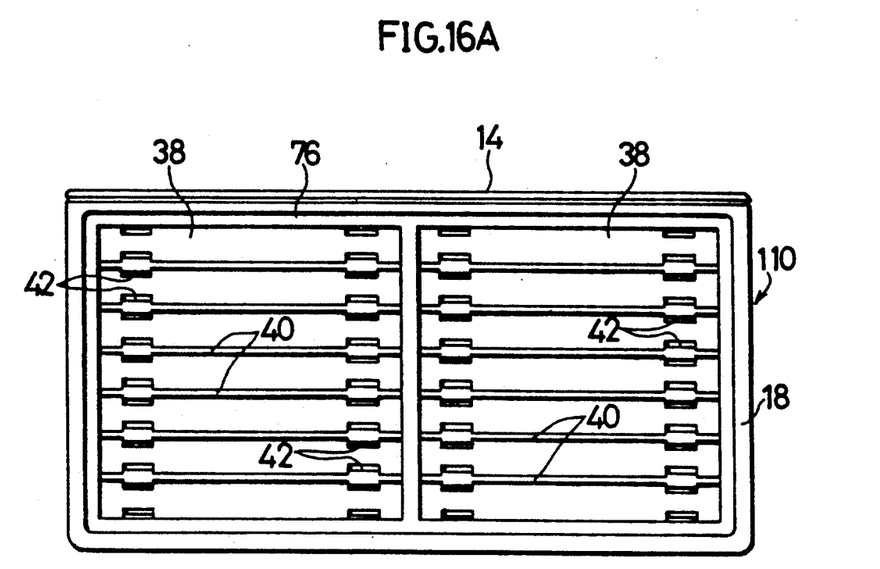
FIG. 16A is a plan view showing a second disk container.
Figure 16B:
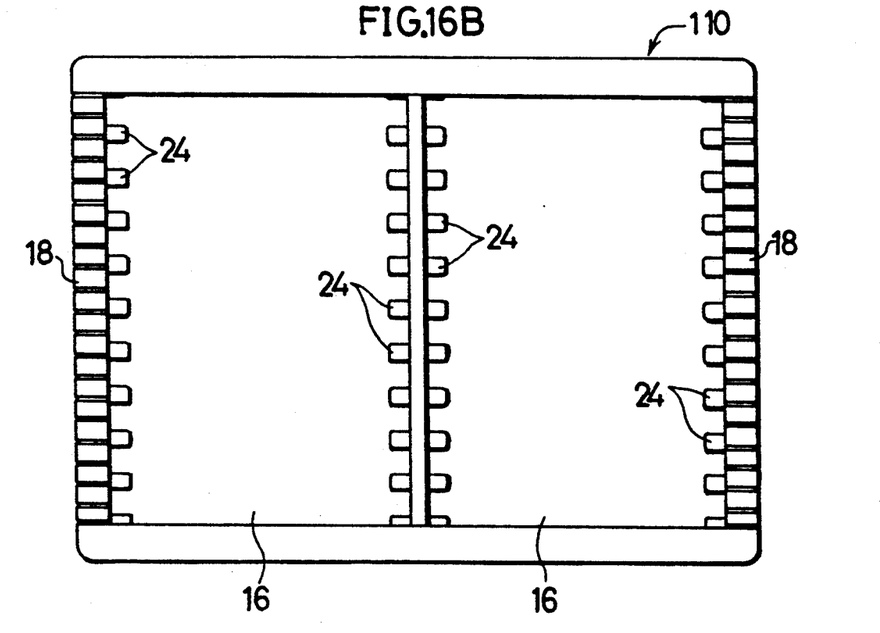
FIG. 16B is a front view of the second disk container.
Figure 17:
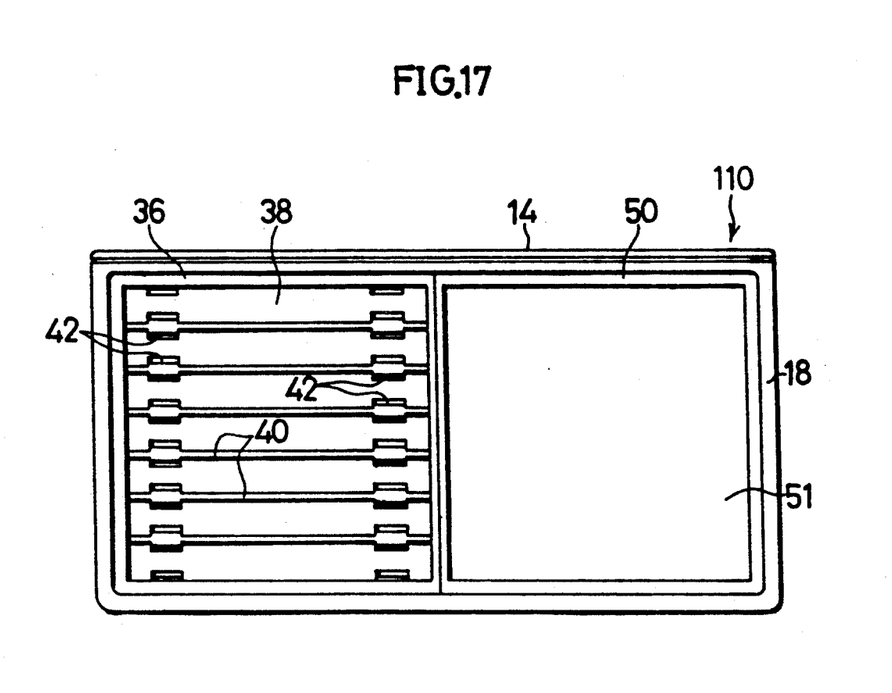
FIG. 17 is a plan view showing a state where two top members are mounted to the second disk container shown in FIGS. 16A and 16B.

In accordance with the present invention, various modifications can be considered in terms of not only a top member but also a main body of a disk container. For example, two container main bodies 10 shown in FIGS. 1 to 4 are connected to each other and placed side by side so as to form a container main body 110 as shown in FIG. 16B. In this case, for example, it may be appropriate to attach a top member 76 as shown in FIG. 16A formed by juxtaposingly connecting the two top members 36 shown in FIGS. 6 to 8 to each other to the container main body 110. It may be also appropriate to select desired two top members out of all the top members shown in the foregoing embodiments and attach the selected two top members to the container main body 110 and placing side by side as shown in FIG. 17.

Figure 18:
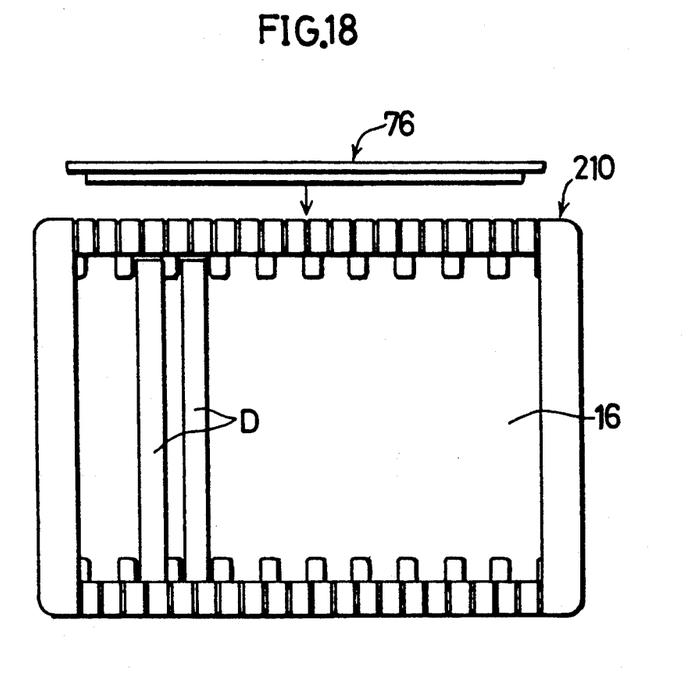
FIG. 18 is a front view showing a third disk container.

Further, according to the present invention, a container main body 210 may be formed into which disks D are vertically inserted in a standing manner and placed side by side as shown in FIG. 18.

As described above, according to the present invention, a container having an insertion opening defined in one of its walls is provided with a top member attaching portion at a top wall thereof, whereby enabling top members having a variety of shapes and functions to be selectively attached to the top member attaching portion. Accordingly, the function of a single container can be enhanced by attaching top members having a variety of shapes and functions to the top member attaching portion provided in the container main body while ensuring improved productivity by fabricating the container main body in common with containers of any type.

Further, in accordance with a container in which a top member is removably attached to a top member attaching portion, it is sufficient for a user to purchase a single container main body. Then, the user can enjoy various additional functions by replacing the top member attached to the container main body with the other one according to needs. Therefore, a container is allowed to have many functions with exhibiting a satisfactory economy thereof.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A container for containing plate-like articles comprising:
    a main body for containing the plate-like articles, the main body including:
        a plurality of support members arranged in parallel with one another in a predetermined direction inside of the main body and adapted for supporting the plate-like articles; and
        an insertion opening formed in a front portion of the main body and adapted for alternatively placing the plate-like articles on the support member and withdrawing the plate-like articles from the support member;
    a top member attached on a top portion of the main body and adapted for temporarily storing one of the plate-like articles, the top member including:
    a recessed portion;
    a plurality of spaced upright members provided in the recessed portion, the upright members extending in substantially parallel relationship with one another, said upright members constituting means for holding the plate-like article in a standing position.

2. A container as defined in claim 1 wherein the main body further includes a recessed top wall formed with an opening in a center portion thereof, an outside of the recessed portion of the top member being engageable with the opening formed in the recessed top wall.

3. A container as defined in claim 1 wherein each of the upright members includes a bar.

4. A container as defined in claim 3 wherein the bar is formed with projections on a top portion of the bar, said projections extending in opposite directions and perpendicular to a longitudinal axis of each bar.

5. A container as defined in claim 1 wherein each of the upright members includes a plurality of pairs of parallel walls for holding the plate-like article in a standing position.

6. A container as defined in claim 1 wherein the plurality of parallel support members are arranged at the same interval in a vertical direction.

7. A container as defined in claim 1 wherein the plurality of parallel support members are arranged at the same interval in a horizontal direction.

8. A container as defined in claim 2 wherein the top member includes a peripheral wall having a clip portion engageable with an edge portion of the opening for fixedly holding the top member in the main body.

9. A container as defined in claim 8 wherein the clip portion includes a clip member flexible in an inward direction of the top member.

10. A container as defined in claim 1 wherein the main body has a plurality of insertion openings.

* * * * *